US012584343B2

(12) United States Patent
Bauriedl et al.

(10) Patent No.: US 12,584,343 B2
(45) Date of Patent: Mar. 24, 2026

(54) ACTUATOR MECHANISM FOR AN ITEM OF HOUSEHOLD EQUIPMENT

(71) Applicant: emz-Hanauer GmbH & Co. KGaA, Nabburg (DE)

(72) Inventors: Josef Bauriedl, Neunburg vorm Wald (DE); Thomas Flierl, Nabburg (DE)

(73) Assignee: EMZ-HANAUER GMBH & CO. KGAA, Nabburg (DE)

(*) Notice: Subject to any disclaimer, the term of this patent is extended or adjusted under 35 U.S.C. 154(b) by 0 days.

(21) Appl. No.: 18/611,913

(22) Filed: Mar. 21, 2024

(65) Prior Publication Data

US 2024/0328231 A1 Oct. 3, 2024

(30) Foreign Application Priority Data

Mar. 28, 2023 (DE) ......................... 102023107855.0

(51) Int. Cl.
*E05F 15/619* (2015.01)

(52) U.S. Cl.
CPC ....... *E05F 15/619* (2015.01); *E05Y 2201/426* (2013.01); *E05Y 2900/304* (2013.01); *E05Y 2900/31* (2013.01); *E05Y 2900/312* (2013.01)

(58) Field of Classification Search
CPC ............. E05F 15/619; E05Y 2201/426; E05Y 2900/31; F16H 2200/0034; F16H 19/04
See application file for complete search history.

(56) References Cited

U.S. PATENT DOCUMENTS 10,202,792 B2 * 2/2019 Kim ...................... E05F 15/619
2011/0023368 A1 2/2011 Mizutani et al.
2014/0306596 A1 * 10/2014 Linke .................... E05F 15/611 312/405
2017/0261252 A1 9/2017 Son et al.
2019/0162006 A1 * 5/2019 Lee ......................... F25D 23/02
(Continued)

FOREIGN PATENT DOCUMENTS

AT 514945 A4 5/2015
CN 204677037 U 9/2015
CN 211950080 U * 11/2020 ............ E05F 16/619
(Continued)

OTHER PUBLICATIONS

English translation of CN211950080U from WIPO (Year: 2020).*

*Primary Examiner* — Muhammad Ijaz
*Assistant Examiner* — Susan M. Heschel
(74) *Attorney, Agent, or Firm* — Tarolli, Sundheim, Covell & Tummino LLP

(57) ABSTRACT

Embodiments of the invention provide a door opener for an electrical appliance of household equipment. The door opener comprises an electric motor and a pusher drivable by means of the electric motor for pressing co-operation with the door of the electrical appliance. A power transmission mechanism is provided between the electric motor and the pusher, which is capable of ensuring a variable effective velocity of the pusher at the same rotational frequency of the electric motor. Certain embodiments provide for a multi-stage rack and pinion gear for this purpose, which is formed by a gear rim and a toothed rack, which can transmit the driving force of the electric motor to the pusher via various gear pairings that can be brought alternately into meshing engagement with one another.

16 Claims, 3 Drawing Sheets

(56) References Cited

U.S. PATENT DOCUMENTS

2020/0263918 A1 8/2020 Lee et al.

FOREIGN PATENT DOCUMENTS

| | | | |
|---|---|---|---|
| CN | 113494224 | A | 10/2021 |
| DE | 9319513 | U1 | 3/1994 |
| DE | 102019128526 | B3 | 3/2021 |
| DE | 102020124099 | A1 | 3/2022 |
| KR | 101447291 | A | 10/2014 |

* cited by examiner

ACTUATOR MECHANISM FOR AN ITEM OF HOUSEHOLD EQUIPMENT

CROSS-REFERENCE TO RELATED APPLICATIONS

This patent application claims the benefit of and priority to German Patent Application No. 102023107855.0, filed on Mar. 28, 2023, which is herein incorporated by reference in its entirety.

FIELD OF THE DISCLOSURE

The invention relates to an actuator mechanism for an item of household equipment. The invention also relates to an item of household equipment provided with such an actuator mechanism.

SUMMARY

In the case of electrical household appliances such as refrigerators, dishwashers, laundry treatment appliances (washing machines, tumble dryers) or the like, the trend is towards equipping such appliances with a function for mechanised, i.e. non-manual door opening. Automatic gap-by-gap opening of the door, which is not triggered by a specific user input, can be useful or desirable in the final phase of a wet cleaning programme, for example. In the case of a dishwasher, for example, this allows hot steam to escape from the wash compartment and the dishes in the wash compartment to dry in an energy-saving manner. In a washing machine, it allows fresh air to enter the washing drum, preventing unpleasant odours from developing in the still-damp laundry. When the door is pushed open in a programme-controlled manner without user intervention, the opening speed with which a door opener of the household appliance opens the door mechanically is usually irrelevant. If, on the other hand, the door opening function is to be activated in response to user intervention (i.e. if the user indicates a specific opening request by means of a suitable operating input, e.g. by touching or pressing a button), user convenience plays an important role. The user does not want to have to wait long for the door opener to push the door open a crack. Instead, the user typically wants the opening process to take place quickly.

To open the closed door of a household appliance of the aforementioned type, it may be necessary to initially overcome an increased resistance. Such initial resistance may, for example, come from a door latch that has the task of keeping the closed door closed. Dishwashers, laundry treatment appliances and other types of appliances such as a microwave oven are regularly equipped with such a door latch. However, refrigerator doors should also remain closed after they have been closed by the user in order to prevent heat from entering the cold interior. For this reason, refrigerators often have an initial resistance that has to be overcome when the door is opened. This opening resistance can, for example, be caused at least in part by a negative pressure in the interior (main compartment) of the refrigerator. Alternatively or additionally, the opening resistance in refrigerators can be caused by magnetic seals, for example, whose magnetic holding effect is intended to keep the door closed, or/and by hinge springs, which are located in the area of the door hinges of the refrigerator and exert a spring preload on the door.

To overcome the opening resistance, an actuator mechanism serving as a door opener must apply an increased force. Once the opening resistance has been overcome, however, a lower force may be sufficient to push the door open further to the desired opening dimension. There may therefore be different force requirements for the actuator mechanism during an opening process. The actuator mechanism must be designed in such a way that it can provide the required maximum force. If an oversized electric motor is not to be used as the drive force source in the actuator mechanism, it is possible that designing the actuator mechanism solely with a view to the required maximum force may result in an insufficient overall opening speed of the door.

The invention is therefore based on the task of providing an actuator mechanism which, on the one hand, is able to ensure a high level of user comfort by quickly moving a movable component of an item of equipment of a private household and, on the other hand, does not require an oversized electric motor as a drive power source.

In order to solve this problem, the invention provides an actuator mechanism for driving a movable component of an item of household equipment, comprising an electric motor, a coupling part which can be driven by means of the electric motor within a limited range of movement, in particular in linear motion, for push or/and pull transmitting with the movable component and a power transmission mechanism between the electric motor and the coupling part. According to the invention, the power transmission mechanism is designed to ensure a variable effective velocity of the coupling part at a given Rotational frequency of the electric motor.

In the solution according to the invention, a variable power transmission mechanism is used between the electric motor and the coupling part. The variability of the power transmission mechanism consists in not ensuring an invariable, always constant effective velocity of the coupling part for a given rotational frequency of the electric motor. Instead, the power transmission mechanism is able to operate in different configurations that enable a different, in particular linear, effective velocity of the coupling part for a given rotational frequency of the electric motor. The different effective velocity of the coupling part at a given rotational frequency of the electric motor means a different force that the actuator mechanism is able to apply in the different configurations. Therefore, a configuration that results in a lower effective velocity of the coupling part at a given rotational frequency of the electric motor can be used when more force is required. On the other hand, a configuration that produces a higher effective velocity of the coupling part at a given rotational frequency of the electric motor can be used when less force is required. As a result, the actuator mechanism can be adapted to a non-uniform force requirement profile when moving the component and the movement of the component can still be carried out in a satisfactory overall time.

The ability of the power transmission mechanism to operate in different configurations can be independent of the position of the coupling part along its path of movement or dependent on the position of the coupling part. In certain embodiments, the power transmission mechanism causes a different effective velocity of the coupling part for a given rotational frequency of the electric motor in different sections of the coupling part's range of movement. The configuration of the power transmission mechanism here depends on the position of the coupling part. If the coupling part is in a first section of its range of movement, the power transmission mechanism causes the coupling part to move at a first effective velocity for a given rotational frequency of the electric motor. If the coupling part is located in another, second section of its range of movement, the power transmission mechanism causes the coupling part to move at a different, second effective velocity for a given rotational frequency of the electric motor. It is understood that the number of configurations of the power transmission mechanism is not limited to two. Rather, the power transmission mechanism may also be adjustable into three or more different configurations. Accordingly, three or more different sections of the range of movement of the coupling part can be defined, each of which differs by a different effective velocity of the coupling part for a given rotational frequency of the electric motor.

In certain embodiments, a configuration in which the power transmission mechanism causes a lower effective velocity of the coupling part for a given rotational frequency of the electric motor can be used to overcome an initial resistance when opening a closed door or generally when moving a movable component of the equipment item. Alternatively or additionally, the configuration with relatively lower effective velocity of the coupling part may be utilised to overcome a closing resistance that may occur during a closing movement of the door towards the end thereof, i.e. just before the final door closed position is reached. More generally speaking, an increased resistance to movement can occur towards the end of the range of movement of the component to be moved by means of the actuator mechanism, and the configuration of the power transmission mechanism with a relatively lower effective velocity of the coupling part is suitable for overcoming this resistance.

On the other hand, a configuration in which the power transmission mechanism causes a greater effective velocity of the coupling part at a given rotational frequency of the electric motor can be used to quickly pass through a further, in particular remaining part of the entire range of movement of the coupling part after overcoming the initial resistance (or before an increased closing resistance or generally an increased final resistance occurs). This can shorten the overall duration of the movement phase and increase user comfort. At the same time, there is no need to use an oversized electric motor.

The sections of the range of movement in which the power transmission mechanism causes a different effective velocity of the coupling part for a given rotational frequency of the electric motor can have different lengths, at least in certain embodiments of the invention. For example, for a given rotational frequency of the electric motor, the power transmission mechanism can cause a higher effective velocity of the coupling part in a section with a greater length than in a section with a shorter length. Of course, a reverse configuration is also conceivable, so that a section with a shorter length is accompanied by a higher effective velocity of the coupling part than a section with a longer length. Each of the sections of the range of movement of the coupling part can, for example, have a length of at least about 10 mm or at least about 15 mm or at least about 20 mm. Alternatively or additionally, each of the sections may, for example, have a length of at most about 120 mm or at most about 100 mm or at most about 80 mm. These figures are of course purely exemplary and relate only to certain embodiments of the invention. A fundamental limitation is not intended with these numerical values.

According to certain embodiments, the power transmission mechanism can comprise a plurality of gear pairings arranged in parallel power transmission branches, each of which defines a different gear ratio and is in meshing engagement alternately, namely in a different section of the coupling part's range of movement. If the coupling part leaves one of the sections, the meshing engagement of the relevant gear pairings is released and another gear pairings enters into meshing engagement.

In certain embodiments, a first gearing of each of the plurality of gear pairings is formed by a toothed rack assembly coupled to the coupling part for common linear movement. In contrast, in these embodiments, the second gearing of each of the plurality of gear pairings is formed as gear toothing. For example, the gear toothing is a spur gear toothing. The toothed rack assembly can be formed by a single rack, but it can alternatively also be formed by a plurality of rack pieces which are arranged to move together, but do not necessarily have to be firmly connected to one another.

In certain embodiments, the second toothing of each of the plurality of gear pairings is formed by a circumferential toothing, in particular extending all the way round, each with a different diameter of the pitch circle. At the same time, the toothed rack assembly has, in association with each of the circumferential gear toothing, longitudinal teeth extending in particular over a different longitudinal section of the rack in each case. An annular extension of the circumferential toothing of the gearwheel means an extension over the entire circumference of the gearwheel. The circumferential gear toothing and the longitudinal teeth can each be offset from one another transversely to the longitudinal direction of the rack.

In certain embodiments, the power transmission mechanism comprises a gear rim comprising a plurality of (at least two) gear rings, each belonging to a different gear pairings. In other embodiments, the power transmission mechanism may comprise separate gears forming the gear toothing of a respective gear pairings.

According to certain embodiments, the actuator mechanism is designed as a prefabricated, mechanically functional actuator module. This actuator module has a module housing in which the electric motor and a rack forming the coupling part are accommodated. The rack can be moved between a feed position and a retreat position in the longitudinal direction of the rack. The feed position can correspond to one of the ends of the coupling part's range of movement; in the feed position, the rack is moved out of the module housing with the coupling part leading. The retreat position, on the other hand, can correspond to the other end of the coupling part's range of movement; in the retreat position, the rack is retracted into the module housing. In the retreat position, the rack can be almost completely retracted into the module housing; however, it cannot be ruled out that the rack still protrudes a little from the module housing in the retreat position, but then at least less than in the feed position.

In certain embodiments, the power transmission mechanism causes a lower effective velocity of the coupling part at a given rotational frequency of the electric motor in a first section of the range of movement of the coupling part that is closer to the retreat position of the rack. In contrast, the power transmission mechanism causes a greater effective velocity of the coupling part in a second section further away from the retreat position. The first section can include the retreat position.

The invention further provides an equipment item for a household, the equipment item comprising a movable component and an actuator mechanism for driving the movable component. The actuator mechanism is of the type explained above. The equipment item is, for example, an electrical appliance having a usable space formed in a main body of the appliance, wherein the movable component is a door arranged to be movable relative to the main body of the appliance for closing the usable space. In certain embodiments, the actuator mechanism is designed and controlled for at least one of the following two modes of operation: it operates as a door opener to push open the closed door or/and it operates as a door closer to close the gap-opened door.

The term "door" is to be understood broadly in the context of the present disclosure. Both in terms of the direction of movement of the door (swivelling, linear) and the spatial orientation and position of the door (e.g. upright on a front of the equipment item or as a flap or cover that can be swivelled upwards on an upper side of the equipment item), the term door is not intended to be subject to any particular restriction. Accordingly, the door can reach a gap-opening position starting from a closed position by being pushed open a little in a straight line or swivelled about a swivel axis.

According to certain embodiments, the actuator mechanism is set up to cause a lower effective velocity of the coupling part within a first partial movement range of the door comprising a door closing position than in a second partial movement range in which the door is more open than in the first partial movement range, for a given rotational frequency of the electric motor. A control unit of the equipment item can control the actuator mechanism in such a way that, regardless of the current configuration of the power transmission mechanism and regardless of the current position of the coupling part within its range of movement, the electric motor is always operated with a constant supply voltage. Although it is possible that, depending on the current load, the rotational frequency of the electric motor does not always remain the same, in such embodiments the supply voltage of the electric motor is not adjusted in order to compensate for possible load and rotational frequency fluctuations of the electric motor.

The equipment item can be, for example, a domestic refrigerator (e.g. refrigerator or freezer), a dishwasher or a laundry treatment machine (e.g. washing machine or tumble dryer).

The coupling of the coupling part with the component to be moved is, at least in certain embodiments, a detachable, i.e. non-permanent coupling, which can be designed, for example, as a mechanical stop coupling, as a form-fit coupling or as a magnetic coupling.

In certain embodiments, the electrical appliance further comprises a door latch for holding the door closed. At a given rotational frequency of the electric motor, the power transmission mechanism is able to ensure a relatively lower effective velocity of the coupling part in a phase in which, when the closed door is opened, a closing holding effect of the door latch still counteracts the pushing open of the door than in a phase in which the closing holding effect of the door latch has already been overcome.

BRIEF DESCRIPTION OF THE DRAWINGS

The invention is further explained below with reference to the accompanying drawings. They represent.

DETAILED DESCRIPTION

Figure 1:
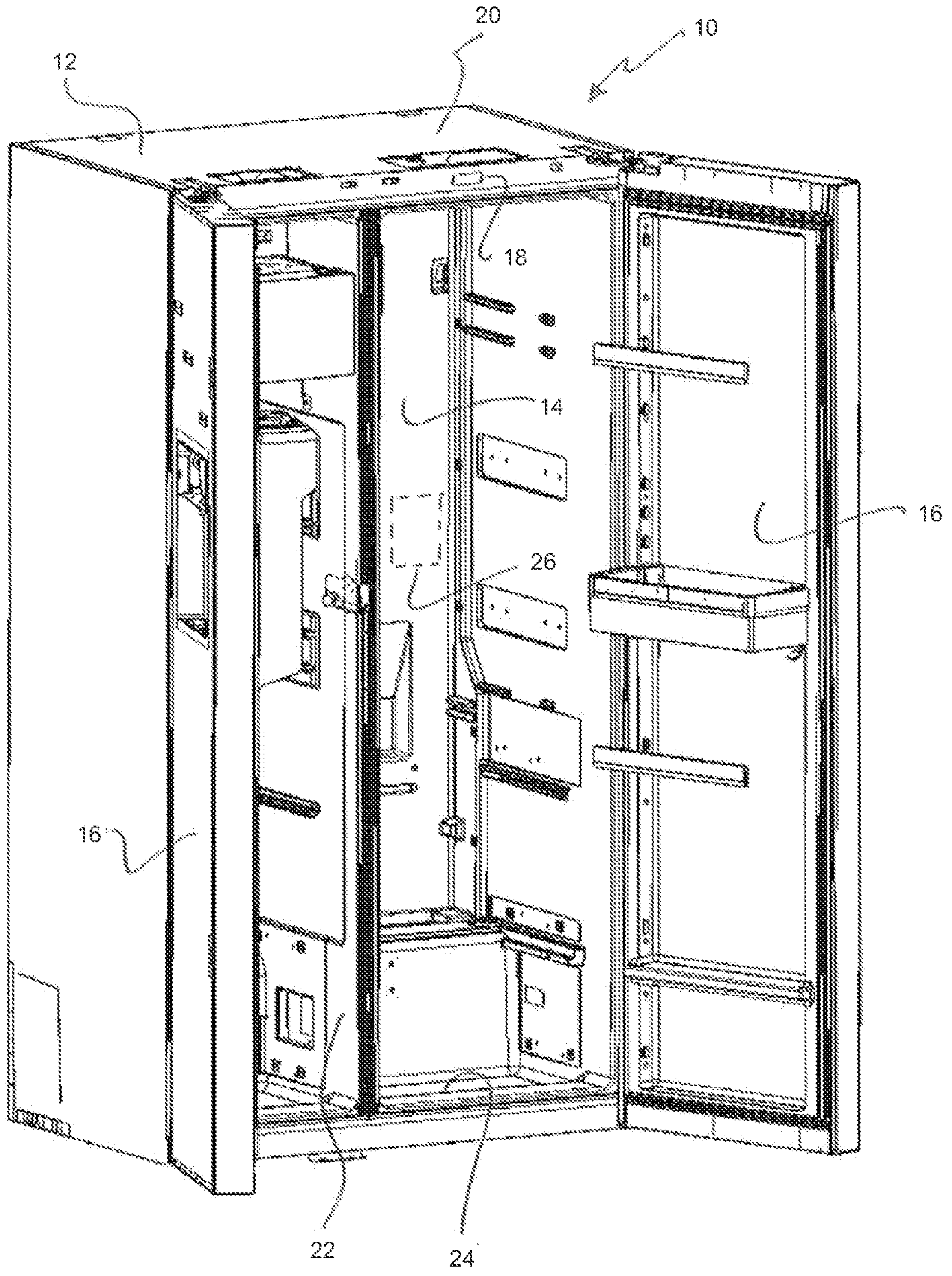
FIG. 1 schematically shows a household refrigerator according to an embodiment example.

Reference is first made to FIG. 1. The refrigerator shown there is generally labelled 10 and is intended for use in a private household. It has a main body of the appliance 12 with a main compartment 14 formed therein, which in the example shown is divided into two parts and can be closed by two doors 16 pivotably attached to the main body of the appliance 12. Each of the doors 16 serves to close one half of the main compartment 14, the doors 16 being arranged side by side in the example shown when they are closed. Refrigerators of such a design are commonly known commercially as "side-by-side." The main compartment 14 is typically divided into a part in which temperatures below the freezing point prevail and which is used for the frozen storage of food, and a part in which temperatures down to just above the freezing point prevail and which is used for the non-frozen storage of food. The freezer section of the main compartment 14 can be closed by one of the doors 16, the refrigerator section by the other of its doors 16. It should be understood that the side-by-side configuration of the refrigerator 10 shown in FIG. 1 is purely exemplary and that a variety of other configurations are possible instead, in particular those with only a single door 16.

At least one of the doors 16 of the refrigerator 10 can be pushed open by means of an actuator mechanism 18, which is only schematically indicated in FIG. 1, without the user having to pull on the door 16 concerned. The actuator mechanism 18 acts here as a door opener, which is why it is also referred to as such below. In the example shown, the door opener 18 is assigned to the right-hand of the two doors 16 in FIG. 1. However, this is only an example; alternatively or additionally, door opener 18 or another door opener not shown here may be assigned to the left-hand door 16 in FIG. 1. In the example shown, the door opener 18 is installed in a roof panel 20 of the main body of the appliance 12; however, this is also only exemplary and it is alternatively conceivable to install the door opener 18 in a centre panel 22 separating the two halves of the cold room 14, in a bottom panel 24 delimiting the bottom of the cold room 14 or in the door 16. The door opener 18 allows mechanised opening of the door 16 in response to a user input, which is recognised as a door opening request by a control unit of the refrigerator 10 arranged schematically at 26. The user input representing the door opening request can be contacting or non-contacting and can comprise, for example, a press on an operating button or a mere approach to a suitably labelled sensor field or a defined movement gesture. Such input options for receiving an operating request from a user are known as such in the art and do not require further explanation at this point.

The door opening function provided by the door opener 18 allows the closed door 16 to be pushed open a gap, the size of the gap being, for example, a few centimetres at the location of the largest gap width.

Figure 2:
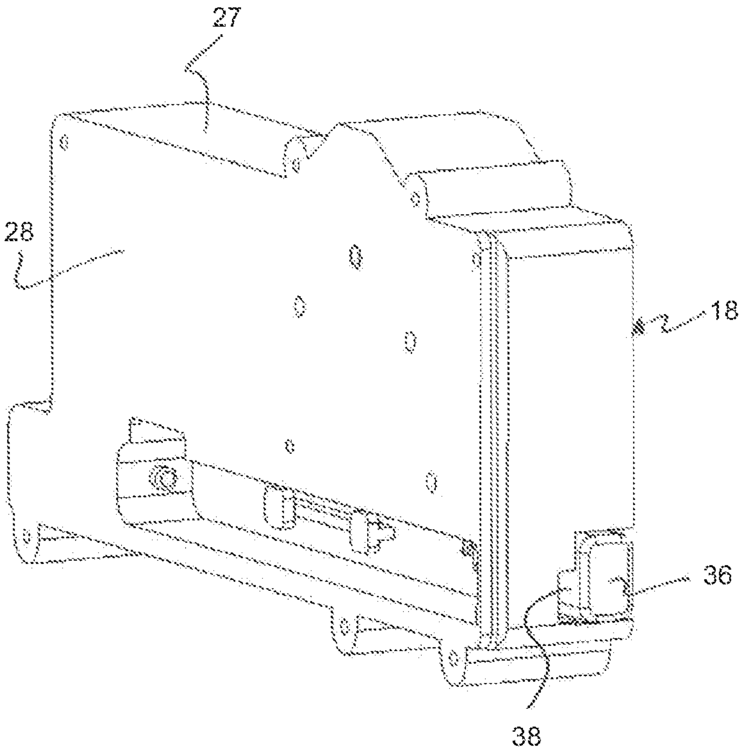
FIG. 2 a door opener for use in a household electrical appliance according to an embodiment example in a state with the handle bar retracted.
Figure 3:
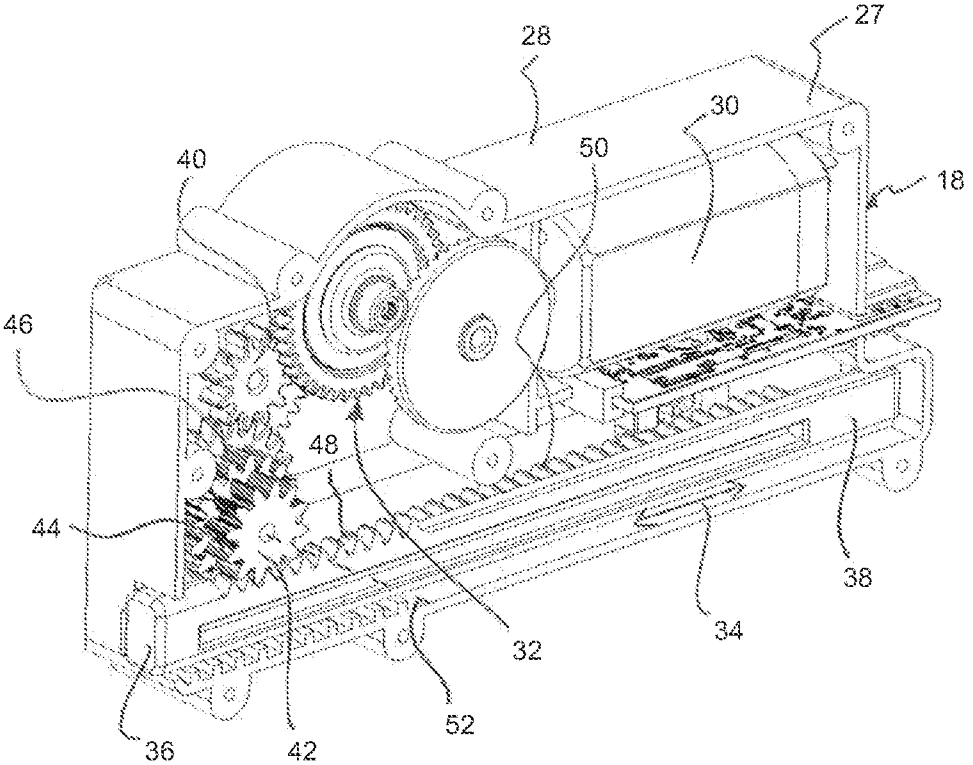
FIG. 3 shows the door opener of FIG. 2 in a cut-away view with the handle bar retracted.
Figure 4:
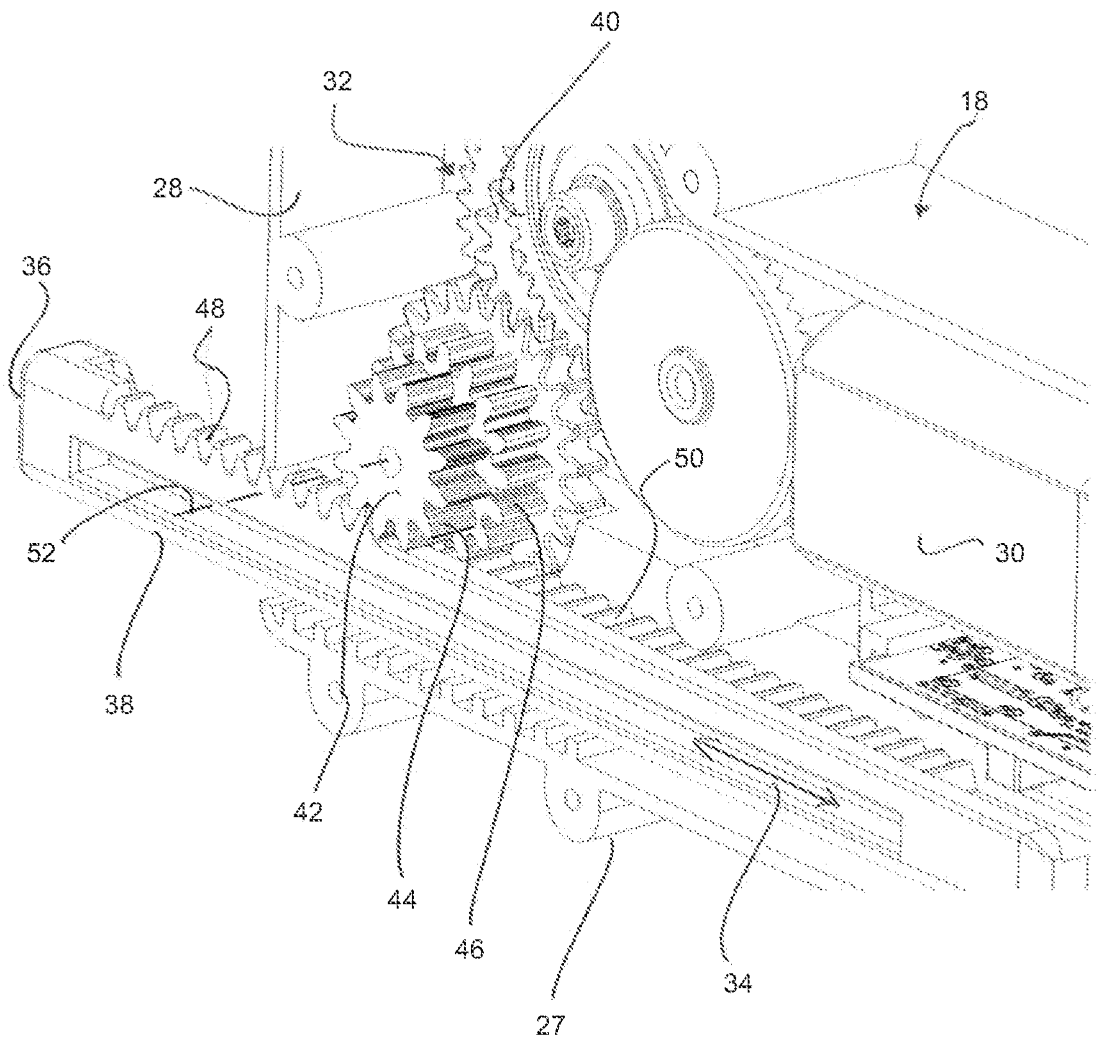
FIG. 4 shows the door opener of FIG. 2 in a cut-away view with the handle bar partially extended.

An exemplary embodiment of the door opener 18 is shown in FIGS. 2 to 4. The door opener 18 of FIGS. 2 to 4 is designed as a prefabricated, mechanically and electromechanically functional actuator module (opener module) 27 with a module housing 28, which is designed with unspecified mounting formations that allow the door opener 18 to be fixed in the desired installation position on the main body of the appliance 12 or on the door 16. The module housing 28 accommodates an electric motor 30 and a power transmission mechanism 32, which is in power-transmitting drive coupling with a coupling part 36, which can be moved forwards and backwards in a linear direction (indicated by a double arrow 34), serves here as a pusher and is also designated as such below.

The power transmission mechanism 32 comprises a toothed rack 38, which is arranged movably in the linear direction 34 and, in the example shown, forms or carries the pusher 36 in the region of one of its longitudinal ends of the rack. The pusher 36 can be an integral part of the toothed rack 38; alternatively, it is conceivable to form the pusher 36, which can also be referred to as a pusher head, from a separate component which is coupled to the toothed rack 38 for joint movement along the linear direction 34. The pusher 36 is configured for pushing engagement with a pressure-receiving component of the refrigerator 10; the pressure-receiving component may be the door 16 or a component of the door 16, if the door opener 18 is arranged on the main body of the appliance 12, or it may be a component of the main body of the appliance 12, if the door opener 18 is arranged on the door.

The pusher 36 can be adjusted along the linear direction 34 between a retracted inactive position and an advanced active position by actuating the electric motor 30. In the inactive position, the pusher 36 is retracted furthest in the direction into the module housing 28 of the door opener 18; in the active position, the pusher 36 is moved furthest out of the module housing 28. To open the door 16, the pusher 36 must be moved from the inactive position towards the active position; the active position defines a gap-opening state for the door 16. In the inactive position of the pusher 36, it is possible to close the door 16 completely. In particular, in the inactive position the pusher 36 can be contactless with the pressure-receiving component and can be a certain distance away from it.

In addition to the rack 38, the power transmission mechanism 32 comprises a reduction gear drive 40 with a spur-toothed output gear rim 42 which, together with the rack 38, forms a multi-stage rack and pinion gear. The gear rim 42 has two circumferential teeth 44, 46 on the output side, each of which forms a gear pairings with one of two longitudinal teeth 48, 50 of toothed rack 38. Each of these gear pairings are in intermeshing engagement in a defined section of the overall range of movement of the toothed rack 38 between the inactive position and the active position of the pusher 36, thereby enabling a transmission of driving force to the pusher 36.

In the example shown, the two circumferential gears 44 and 46 of the gear rim 42 are each designed as full-circle gears, i.e. they extend over the entire circumference of the gear rim 42 and each have a different diameter of the pitch circle. For a given rotational frequency of the electric motor 30 and thus a given rotational frequency of the gear rim 42, this results in a different (circular) effective velocity of the gearing 44 compared to the gearing 46. The gearing with the larger diameter (in the example shown, gearing 46) has a greater effective velocity than the gearing with the smaller diameter (in this case, gearing 44). The different effective velocity of the gearings 44, 46 causes a correspondingly different (linear) effective velocity of the toothed rack 38 and consequently of the pusher 36, depending on which of the gear pairings is meshing at the respective time and transmitting drive force to the toothed rack 38. Corresponding to the axial offset of the two gearings 44, 46 (axially in relation to an axis of rotation 52 of the gear rim 42), the two gearings 48, 50 are also formed on the toothed rack 38 with a corresponding offset in the direction transverse to the linear direction 34.

The pairing of the smaller-diameter circumferential gearing 44 of the gear rim 42 with the gearing 48 of the toothed rack 38 serves to drive the pusher 36 over such a section of the overall range of movement of the pusher 36 which, starting from the inactive position, extends over a length which is required to overcome an initial opening resistance of the closed door 16. This resistance may be caused, at least in part, by a negative pressure prevailing in the main compartment 14 when the door 16 is closed. Alternatively or additionally, other causes of this resistance are possible, for example a magnetic holding force which holds the door 16 closed, or/and a spring bias acting on the door 16 which forces the door 16 into its closed position. In appliance types other than a domestic refrigerator, the aforementioned initial resistance when opening the door 16 may at least partly originate from a mechanical door catch (not shown in detail in the drawings), which performs a function for holding the door closed and possibly also for pulling the door shut when closing it. Regardless of the specific cause of the initial resistance to opening, a further movement of the pusher 36, i.e. a further pushing open of the door 16 after the initial resistance has been at least largely overcome, requires only a comparatively small amount of force.

For this reason, a configuration with a larger reduction ratio of the power transmission mechanism 32 is used to drive the rack 38 in an initial section of the entire range of movement of the pusher 36, starting from the state with the door 16 closed. In this configuration, the smaller-diameter gearing 44 of the gear rim 42 is in Intermeshing engagement with the gearing 48 of the toothed rack 38 in the initial section.

On a subsequent remaining section until the maximum extended position of the pusher 36 is reached (i.e. active position), however, a configuration with a lower reduction of the power transmission mechanism 32 is used. In this configuration, the larger diameter gearing 46 meshes with the gearing 50 of the toothed rack 38. This remaining section of the opening travel of the door 16 can thus be traversed at an increased speed, which speeds up the opening process overall. The supply voltage of the electric motor 30 does not need to be changed for this. This can be operated with a constant supply voltage.

Accordingly, the design of the door opener 20 shown enables the transmission of the rack and pinion gear 38, 42 to be varied in several (here: two) stages. Depending on the gear stage, a faster or slower movement of the pusher 36 with less or more force exerted on the door 16 is achieved at a given rotational frequency of the electric door 30. The stage with the slower movement speed of the pusher 36 can be used to overcome an initial opening resistance when opening the door 16. In contrast, the step with the increased speed of movement of the pusher 36 can be used to quickly bring the pusher 36 to its desired end position (active position) after overcoming such an initial opening resistance.

It is understood that the explained rack and pinion gear 38, 42 can be designed not only with two stages, but also with three stages or four stages, for example. Depending on the profile of the resistance forces to be overcome when opening the door 16, it may be advisable to design the door opener 20 with more than two transmission configurations. For such a case, for example, the gear rim 42 can be designed with more than two circumferential toothing configurations and the toothed rack 38 can have a corresponding number of longitudinally offset longitudinal toothing configurations. The interaction of the various gear pairings of gear rim 42 and toothed rack 38 is such that when one of the gear pairings is out of meshing engagement, another of the gear pairings comes into meshing engagement, so that a flow of force from electric motor 30 to pusher 36 is always ensured.

If a tension-transmitting coupling between the coupling part 36 and the door 16 is possible, e.g. by a magnetic coupling or a detachable form-fit coupling, the actuator mechanism 18 can alternatively or additionally operate as a door closer, with which the door 16 can be pulled closed from a gap-open position into its closed position. The gear stage of the rack and pinion gear with a higher transmission ratio can be used on a first part of the closing path and the gear stage with a lower transmission ratio can be used on a second, remaining part of the closing path, on which an increased closing resistance may have to be overcome.

What is claimed is:

1. An actuator mechanism for driving a movable component of an item of household equipment, comprising:
- an electric motor;
- a coupling part coupled with the movable component in a detachable manner and configured to be driven by the electric motor within a limited range of linear movement for push and/or pull transmitting with the movable component; and
- a power transmission mechanism comprising a plurality of gear pairings between the electric motor and the coupling part, wherein the plurality of gear pairings are arranged in parallel power transmission branches, each gear pairing defining a different transmission ratio, and each gear pairing intermeshing engagement in a different section of the range of movement of the coupling part,
- wherein a toothing of each gear pairing is formed as a gear toothing by a circumferential toothing of a gear wheel extending all around and having a different pitch circle diameter in each case, the power transmission mechanism being capable of causing a respectively different effective velocity of the coupling part at a given rotational frequency of the electric motor in different sections of the range of movement of the coupling part and the actuator mechanism being configured to overcome an initial resistance and a closing resistance.

2. The actuator mechanism according to claim 1, wherein the different sections of the range of movement of the coupling part have different lengths.

3. The actuator mechanism according to claim 2, wherein the power transmission mechanism causes a higher effective velocity of the coupling part in a section with a greater length than in a section with a shorter length for a given rotational frequency of the electric motor.

4. The actuator mechanism according to claim 2, wherein each of the different sections of the range of movement of the coupling part has a length of at least about 10 mm and/or has a length of at most about 120 mm.

5. The actuator mechanism according to claim 1, wherein another toothing of each of the plurality of gear pairings is formed by a toothed rack assembled coupled to the coupling part for a common linear movement.

6. The actuator mechanism according to claim 5, wherein the toothed rack assembly has, in association with each of the circumferential toothing of the gear wheel, a longitudinal toothing extending over a different longitudinal section of the rack in each case.

7. The actuator mechanism according to claim 6, wherein the circumferential gear toothing and the longitudinal teeth are each offset relative to one another transversely to the longitudinal direction of the rack.

8. The actuator mechanism according to claim 1, wherein:
- the actuator mechanism is designed as a prefabricated, mechanically functional actuator module;
- the actuator module has a module housing in which the electric motor and a rack forming the coupling part are accommodated; and
- the rack is movable in the longitudinal direction of the rack between a feed position, in which the rack is moved out of the module housing with the coupling part in front, and a retreat position, in which the rack is retracted into the module housing.

9. The actuator mechanism according to claim 8, wherein the power transmission mechanism, at a given rotational frequency of the electric motor, causes a lower effective velocity of the coupling part in a first section of the range of movement of the coupling part which comprises the retreat position, and causes a higher effective velocity of the coupling part in a second section which is further away from the retreat position.

10. The actuator mechanism according to claim 1, wherein the detachable coupling is one of a mechanical stop coupling, a form-fit coupling, and a magnetic coupling.

11. An equipment item for a household, the equipment item comprising:
- a movable component; and
- an actuator mechanism configured for driving the movable component, wherein the actuator mechanism comprises:
- an electric motor;
- a coupling part coupled with the movable component in a detachable manner and which is capable of being driven by the electric motor within a limited range of movement for push and/or pull transmitting coupling with the movable component; and
- a power transmission mechanism comprising a plurality of gear pairings between the electric motor and the coupling part, wherein the plurality of gear pairings are arranged in parallel power transmission branches, each gear pairing defining a different transmission ratio, and each gear pairing intermeshing engagement in a different section of the range of movement of the coupling part,
- wherein a toothing of each gear pairing is formed as a gear toothing by a circumferential toothing of a gear wheel extending all around and having a different pitch circle diameter in each case, wherein the power transmission mechanism being capable of causing a respectively different effective velocity of the coupling part at a given rotational frequency of the electric motor in different sections of the range of movement of the coupling part and the actuator mechanism being configured to overcome an initial resistance and a closing resistance.

12. The equipment item according to claim 11, wherein:
- the equipment item is an electrical appliance with a usable space formed in a main body of the electrical appliance;
- the movable component is a door arranged movably relative to the main body of the electrical appliance for closing the usable space; and
- the actuator mechanism is designed and controlled for at least one of the two following modes of operation:
- serving as a door opener to push open the closed door; and
- serving as a door closer to close the gap-opened door.

13. The equipment item according to claim 12, wherein the actuator mechanism is configured to cause a lower effective velocity of the coupling part within a first partial movement range of the door comprising a door closing position than in a second partial movement range, in which the door is more open than in the first partial movement range, for a given rotational frequency of the electric motor.

14. The equipment item according to claim 12, wherein the equipment item is one of the following: a domestic refrigerator, a dishwasher, or a laundry treatment appliance.

15. The equipment item according to claim 11, wherein the detachable coupling is one of a mechanical stop coupling, a form-fit coupling, and a magnetic coupling.

16. An actuator mechanism for driving a movable component of an item of household equipment, comprising:

an electric motor;

a coupling part configured to be driven by the electric motor within a limited linear range of movement for pushing and/or pulling the movable component; and a power transmission mechanism comprising a plurality of gear pairings between the electric motor and the coupling part, wherein the plurality of gear pairings are arranged in parallel power transmission branches, each gear pairing defining a different transmission ratio, and each gear pairing intermeshing engagement in a different section of the range of movement of the coupling part, wherein a toothing of each gear pairing is formed as a gear toothing by a circumferential toothing of a gear wheel extending around the entire circumference of the gear wheel, the power transmission mechanism being capable of ensuring a variable effective velocity of the coupling part at a given rotational frequency of the electric motor, the power transmission mechanism being capable of causing a respectively different effective velocity of the coupling part at a given rotational frequency of the electric motor in different sections of the range of movement of the coupling part and the actuator mechanism being configured to overcome an initial resistance and a closing resistance.

* * * * *